(12) United States Patent
Tanaka et al.

(10) Patent No.: US 7,436,523 B2
(45) Date of Patent: Oct. 14, 2008

(54) EYEGLASS FRAME MEASUREMENT APPARATUS

(75) Inventors: Motoshi Tanaka, Gamagori (JP); Yoshinori Matsuyama, Anjo (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 11/714,818

(22) Filed: Mar. 7, 2007

(65) Prior Publication Data

US 2007/0253003 A1 Nov. 1, 2007

(30) Foreign Application Priority Data

Mar. 7, 2006 (JP) ............................. 2006-061828

(51) Int. Cl.
*G01B 11/24* (2006.01)
*G01B 3/14* (2006.01)
*G01J 1/42* (2006.01)

(52) U.S. Cl. .......................... 356/601; 356/218; 33/551

(58) Field of Classification Search ................. None
See application file for complete search history.

(56) References Cited

U.S. PATENT DOCUMENTS

| 5,138,770 | A | | 8/1992 | Matsuyama |
|---|---|---|---|---|
| 5,139,373 | A | * | 8/1992 | Logan et al. .................. 409/80 |
| 5,228,242 | A | | 7/1993 | Mastsuyama |
| RE35,898 | E | | 9/1998 | Shibata et al. |
| 6,325,700 | B1 | | 12/2001 | Mizuno et al. |

\* cited by examiner

*Primary Examiner*—Michael P Stafira
(74) *Attorney, Agent, or Firm*—Sughrue Mion, PLLC

(57) ABSTRACT

An eyeglass frame measurement apparatus includes a holding unit; a rotational base and a tracing stylus arranged on the rotational base. Three-dimensional shape of a frame is measured by detecting the movement of the tracing stylus in a radius direction and a warpage direction. Slit place is integrally arranged with the stylus and a light-projection-and-receiving unit that includes a light-emitting portion and a two-dimensional sensor capable of selecting a received pixel is arranged on the base. The two-dimensional sensor includes first and second light-receiving lines not parallel to each other, and includes a first slit not parallel to the first light-receiving line and a second slit not parallel to the second light-receiving line. The movement of the stylus is detected based on a projection position of the first and second slits detected by the first and second light-receiving lines.

5 Claims, 7 Drawing Sheets

EYEGLASS FRAME MEASUREMENT APPARATUS

BACKGROUND OF THE INVENTION

The present invention relates to an eyeglass frame measurement apparatus for measuring a shape of a rim of an eyeglass frame into which an eyeglass lens is to be fitted.

BACKGROUND ART

A known eyeglass frame measurement apparatus holds an eyeglass frame in a substantially horizontal orientation and electrically or optically detects movement of a tracing stylus inserted into an inner groove of a rim of the frame, thereby measuring a three-dimensional shape of the inner groove of the rim.

An example apparatus for electrically detecting movement of the tracing stylus detects movement of the tracing stylus in a direction of a radius of the rim of the held frame by a rotary encoder through a gear, and detects movement of the tracing stylus in a direction of warpage of the rim of the held frame, by a rotary encoder through a gear. However, since the movement of the tracing stylus is detected by the encoder, the movement of the tracing stylus becomes slow as a result of resistance. Moreover, a problem of gear backlash also arises.

Meanwhile, an example apparatus for optically detecting movement of the tracing stylus detects movement of the tracing stylus in the direction of the radius of the held rim and in the direction of the warpage of the same by use of a screen having a plurality of nonparallel slits, and a light-emitting portion and a one-dimensional light-receiving sensor (a linear image sensor) arranged opposite each other with the screen being interposed therebetween. Another example apparatus detects movement of the tracing stylus in the direction of the radius of the held rim and in the direction of the warpage of the same by use of a screen having a pinhole, and a light-emitting portion and a two-dimensional light-receiving sensor (an area image sensor) arranged opposite each other with the screen being interposed therebetween. However, when a large measurement range is ensured also in the direction of the warpage of the rim and a two-dimensional light-receiving sensor is used for enhancing the accuracy of measurement, the pieces of example apparatus require a longer measurement time.

SUMMARY OF THE INVENTION

The technical object of the present invention is to provide an eyeglass frame measurement apparatus which enables movement of a tracing stylus with small force, as well as high-speed measurement, without complication of the configuration of the apparatus.

To achieve the above object, the present invention is characterized by having the following configuration.

(1) An eyeglass frame measurement apparatus for measuring a shape of a rim of an eyeglass frame, comprising:

a holding unit that holds the frame in a predetermined state;

a rotational base arranged to be rotatable with respect to the holding unit;

a tracing stylus to be inserted into an inner groove of the rim, the tracing stylus being arranged on the rotational base to be movable in a radius direction and a warpage direction of the rim;

a light-projection-and-receiving unit that includes a light-emitting portion and a two-dimensional light-receiving sensor capable of selecting a pixel which receives light from the light-emitting portion;

a slit plate interposed between the light-emitting portion and the sensor; and an arithmetic operation portion that obtains a three-dimensional shape of the rim by detecting, based on a result of receipt of the light by the sensor, movements of the tracing stylus inserted in the inner groove of the rim along the radius vector direction and the warpage direction in response to rotation of the rotational base, wherein one of the light-projection-and-receiving unit and the slit plate is fixedly arranged on the rotational base, and the other is arranged to be movable along with the tracing stylus, wherein the sensor includes a first light-receiving line and a second light-receiving line which are not parallel to each other and for which the pixel for receiving the light from the light-emitting portion is selectively set, wherein the slit plate includes a first slit which permits passage of the light to be received by the first light-receiving line and is not parallel to the first light-receiving line, and a second slit which permits passage of the light to be received by the second light-receiving line and is not parallel to the second light-receiving line, and wherein the arithmetic operation portion detects the movements of the tracing stylus in the radius direction and the warpage direction based on a result of receipt of the light by the first and second light-receiving lines.

(2) The eyeglass frame measurement apparatus according to (1), wherein the first light-receiving line crosses the second light-receiving line at right angles;

the first slit crosses the first light-receiving line at right angles; and the second slit crosses the second light-receiving line at right angles.

(3) The eyeglass frame measurement apparatus according to (1), wherein the sensor includes a plurality of the first parallel light-receiving lines and a plurality of the second parallel light-receiving lines.

(4) The eyeglass frame measurement apparatus according to (1), wherein at least one of the first and second slits is formed plurally in the slit plate at intervals narrower than a light-receiving width of the sensor, and widths of the slits are equal to each other; and the slit plate includes an index for specifying each of the slits.

(5) The eyeglass frame measurement apparatus according to (1), wherein at least one of the first and second slits is formed plurally in the slit plate at intervals narrower than the light-receiving width of the sensor, and widths of the slits differ from each other.

DESCRIPTION OF PREFERRED EMBODIMENT

Figure 1:
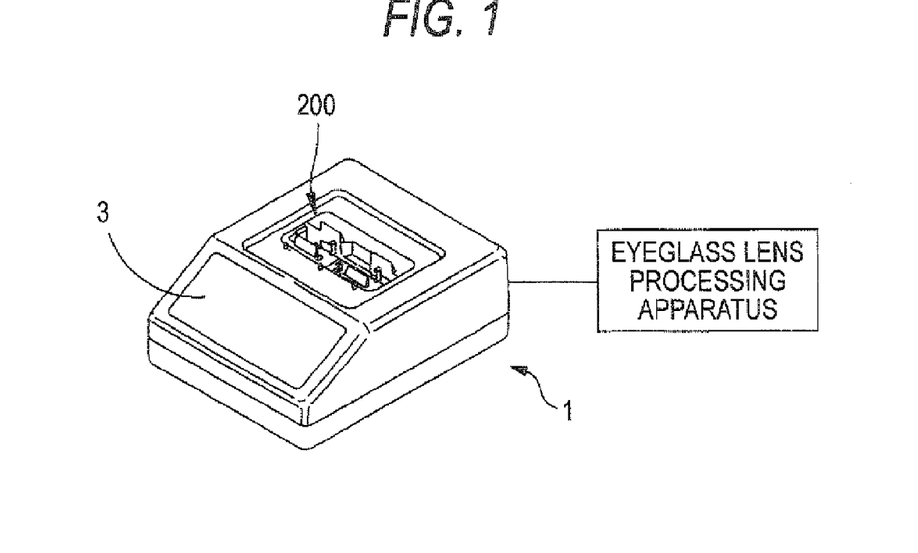
FIG. 1 is a general external view of an eyeglass frame measurement apparatus.

An embodiment of the present invention will be described hereinbelow with reference to the drawings. FIG. 1 is a general external view of an eyeglass frame measurement apparatus 1. A frame-holding unit 200 is disposed in an upper portion of the apparatus 1, and a frame measurement unit 240 (see FIG. 3) is disposed on a lower side of the frame-holding unit 200. A display (doubling as an input portion and a display portion) 3 of touch screen type is disposed on a front surface of the apparatus 1. Data on a shape of a rim of an eyeglass frame F (see FIG. 2) obtained by the apparatus 1, data input by the display 3, and the like are transmitted to an eyeglass lens processing apparatus.

<Frame-Holding Unit>

Figure 2:
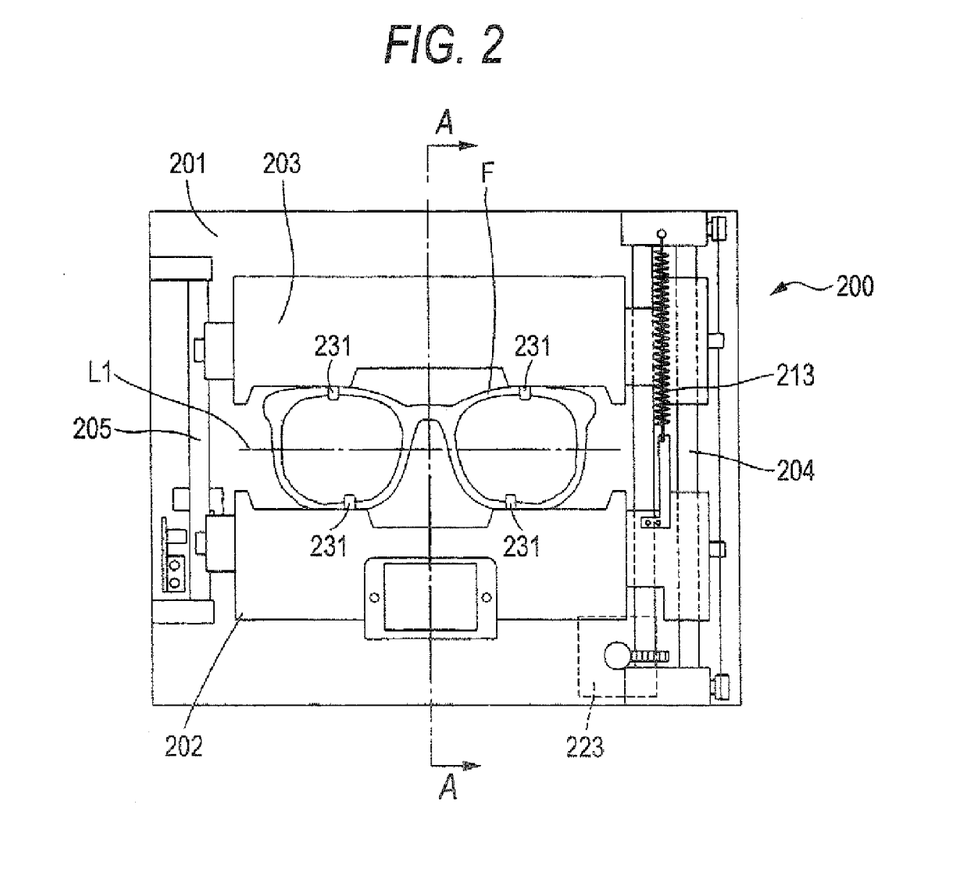
FIG. 2 is a plan view showing a general configuration of a frame-holding unit.
Figure 3:
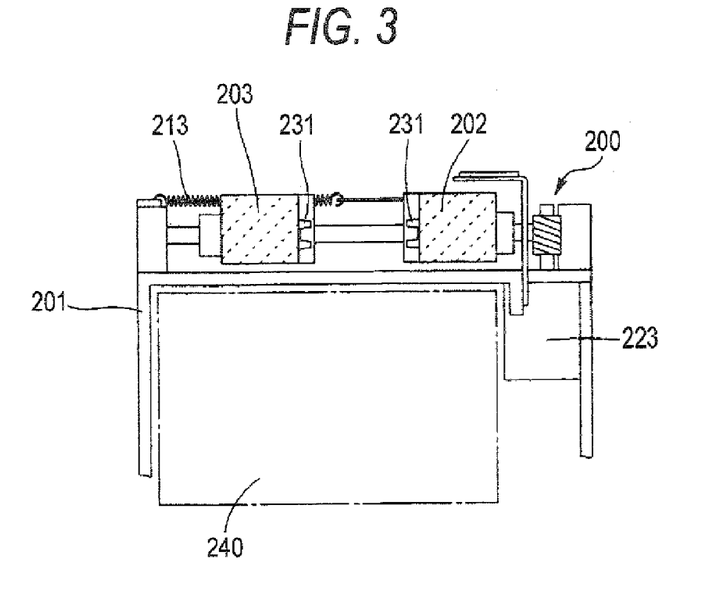
FIG. 3 is a partial cross-sectional view showing the general configuration of the frame-holding unit.

FIG. 2 is a plan view showing a general configuration of the frame-holding unit 200. FIG. 3 shows a partial cross-sectional view taken along a line A-A shown in FIG. 2. Parallel guide rails 204 and 205 extending in a front-to-back direction (a vertical direction of the frame F held in an essentially horizontal orientation) are fixed to a stationary base 201, and sliders 202 and 203 for holding the frame F are movably supported by the guide rails 204 and 205. The sliders 202 and 203 are pulled at all times in a direction oriented toward the center (i.e., a baseline L1) between the sliders 202 and 203 by a spring 213. The frame F is held between clamp pins 231 located side by side at two positions of the slider 202 and clamp pins 231 located side by side at two positions of the slider 203; and is held on an essentially-horizontal measurement reference plane. Opening and closing of each of the clamp pins 231 are performed by driving a motor 223 mounted on the back of the stationary base 201. A unit described in, e.g., U.S. Pat. No. 6,325,700 (JP-A-2000-314617) can be used as such the frame-holding unit 200.

<Frame Measurement Unit>

<<Rotational Base>>

Figure 4:
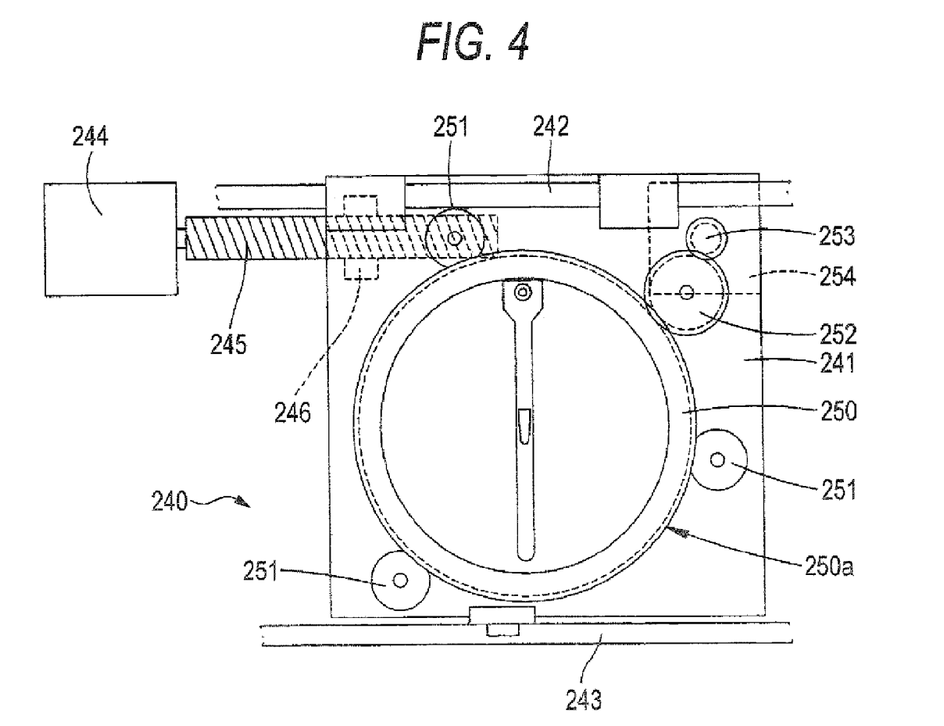
FIG. 4 is a plan view showing a general configuration of a frame measurement unit.

The frame measurement unit 240 is disposed on a lower side of the stationary base 201. FIG. 4 is a plan view showing a general configuration of the frame measurement unit 240. Parallel guide rails 242 and 243 extending in a right-to-left direction (a right-to-left direction of the frame F held in the essentially horizontal orientation) are fixed to the back of the stationary base 201. A movable base 241 is movably supported by the guide rails 242 and 243. A motor 244 is mounted on the back of the stationary base 201, and a male ball screw 245 fixed to a rotary shaft of the motor 244 is screw-engaged with a female screw 246 fixed to the movable base 241. Thus, the movable base 241 is moved in the right-to-left direction by rotation of the motor 244.

Moreover, a rotational base 250 is rotatably supported by rollers 251 disposed at three locations of the movable base 241. A motor 254 is mounted on the back of the movable base 241, and a gear 253 fixed to a rotary shaft of the motor 254 is meshed with a gear 250a formed along an outer brim portion of the rotational base 250 through a gear 252. Thus, the rotational base 250 is rotated by rotation of the motor 254.

<<Tracing stylus Unit>>

Figure 5:
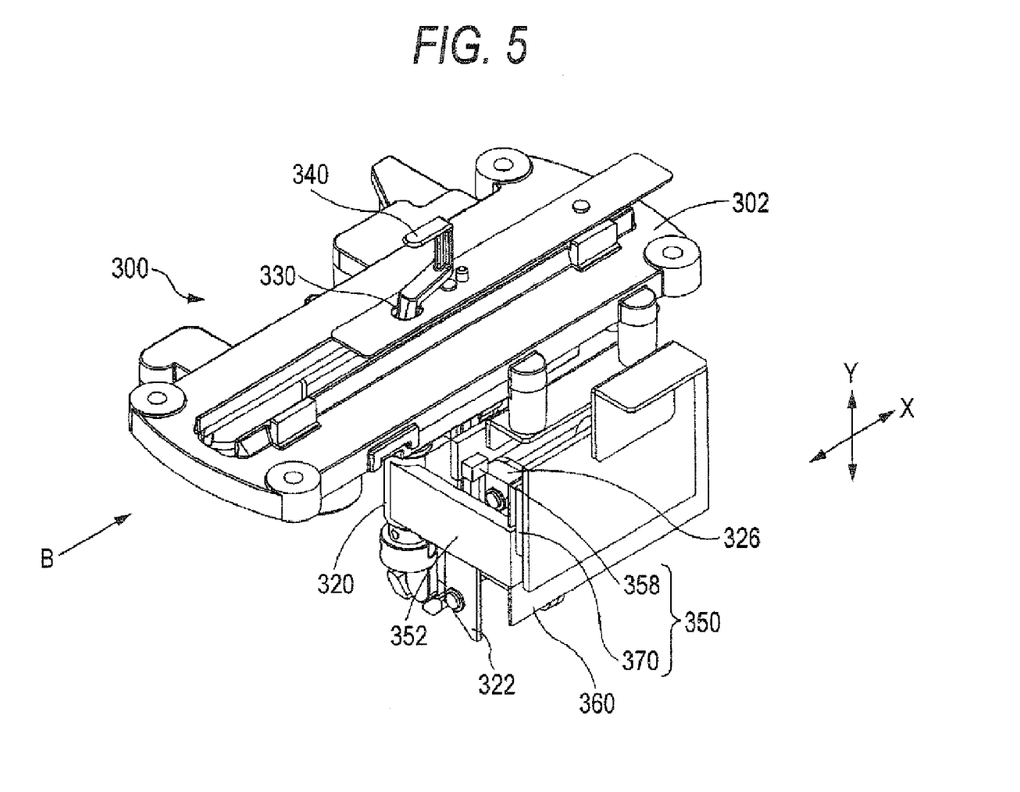
FIG. 5 is a perspective view showing a general configuration of a tracing stylus unit.
Figure 6:
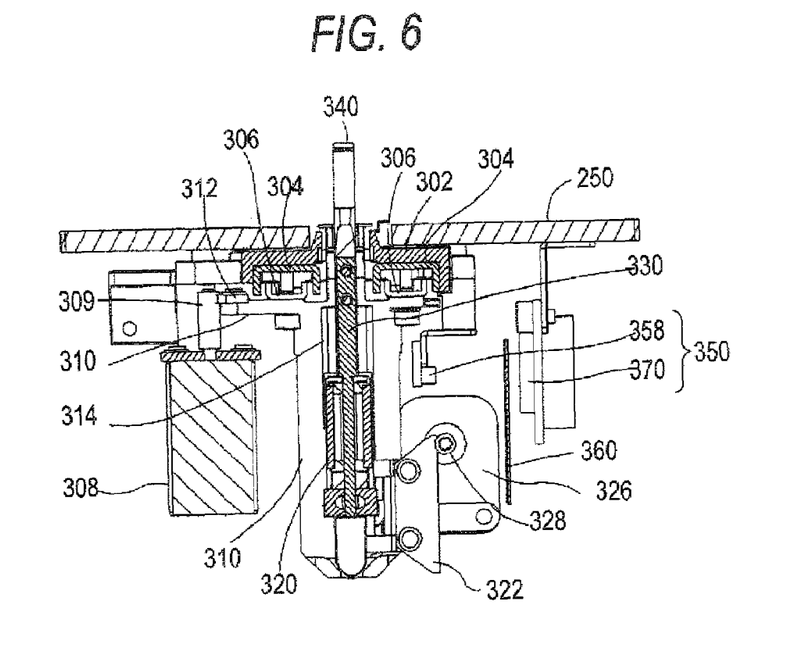
FIG. 6 is a fragmentary cross-sectional view showing the general configuration of the tracing stylus unit.
Figure 7:
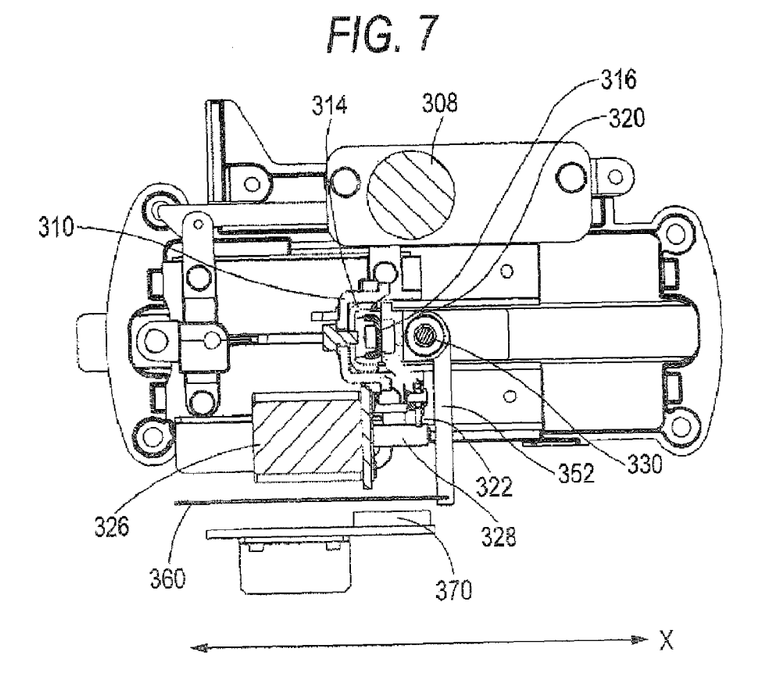
FIG. 7 is a fragmentary cross-sectional view showing the general configuration of the tracing stylus unit.

A tracing stylus unit 300 is disposed on a lower side of the rotational base 250. FIG. 5 is a perspective view showing a general configuration of the tracing stylus unit 300; FIG. 6 is a fragmentary cross-sectional view of the tracing stylus unit 300 when viewed in the direction B in FIG. 5; and FIG. 7 is a fragmentary cross-sectional view of the tracing stylus unit 300 when viewed from below. A stationary block 302 is fixed to the back of the rotational base 250. Parallel guide rail receivers 304 extending in a direction (hereinafter taken as an "X-axis direction" and corresponds to a direction of a radius vector of the rim of the frame F held in the essentially horizontal orientation) orthogonal to a paper plane of FIG. 6 are fixed to the stationary block 302. Parallel slide rails 306 are movably supported by the guide rail receivers 304, and a movable support base 310 is fixed to the slide rails 306. Moreover, a motor 308 is fixed to the stationary block 302, and a gear 309 fixed to a rotary shaft of the motor 308 is meshed with a rack 312 that is fixed to the movable support base 310 and extends in the X-axis direction. As a result, the movable support base 310 is moved in the X-axis direction by rotation of the motor 308.

A guide rail receiver 314 extending in a up-and-down direction (hereinafter taken as a "Y-axis direction" and corresponding to a direction of warpage of the rim of the frame F held in the essentially horizontal orientation) orthogonal to the X-axis direction is fixed to the movable support base 310. A guide rail 316 is movably supported by the guide rail receiver 314, and a movable support base 320 is fixed to the guide rail 316. Moreover, a motor 326 is fixed to the movable support base 310, and a gear 328 fixed to a rotary shaft of the motor 326 is meshed with a rack 322 which is fixed to the movable support base 320 and extends in the Y-axis direction. As a result, the movable support base 320 is moved in the Y-axis direction by rotation of the motor 326.

A tracing stylus shaft 330 extending in the Y-axis direction is rotatably supported by the movable support base 320 through a bearing, and a tracing stylus 340 is fastened to an upper end of the shaft 330. A leading end of the tracing stylus 340 lies in the rotational center axis of the shaft 330. At the time of measurement of the rim of the frame F, the motor 308 and the motor 326 are driven such that the leading end of the tracing stylus 340 is inserted into an inner groove of the rim of the frame F held in a predetermined state (the substantially horizontal orientation) by the frame-holding unit 200.

The tracing stylus unit 300 is provided with a unit for optically detecting a radius length "r" corresponding to a change in the movement of the movable support base 320 in the X-axis direction and a warpage height "h" corresponding to a change in the movement of the movable support base 320 in the Y-axis direction. A slit plate 360 is fixed to a leading end of an arm 352 extending from a side surface of the movable support base 320 in parallel to the X-axis direction corresponding to the moving direction of the movable support base 310. A light-projection-and-receiving unit 350 constituted by a light-emitting portion 358, such as an LED or the like, and a two-dimensional light-receiving sensor (an area image sensor) 370 is fixed to the rotational base 250 in such a manner that the light-emitting portion 358 opposes the light-receiving sensor 370 with the slit plate 360 interposed therebetween. An MOS sensor capable of selecting a pixel for receiving light among all of two-dimensionally arranged pixels is used as the two-dimensional light-receiving sensor 370. The MOS sensor is fabricated by a precision machining technique pertaining to manufacture of a semiconductor such that the layout of one pixel is managed in units of tens of nanometers.

<<Slit Plate>>

Figure 8:
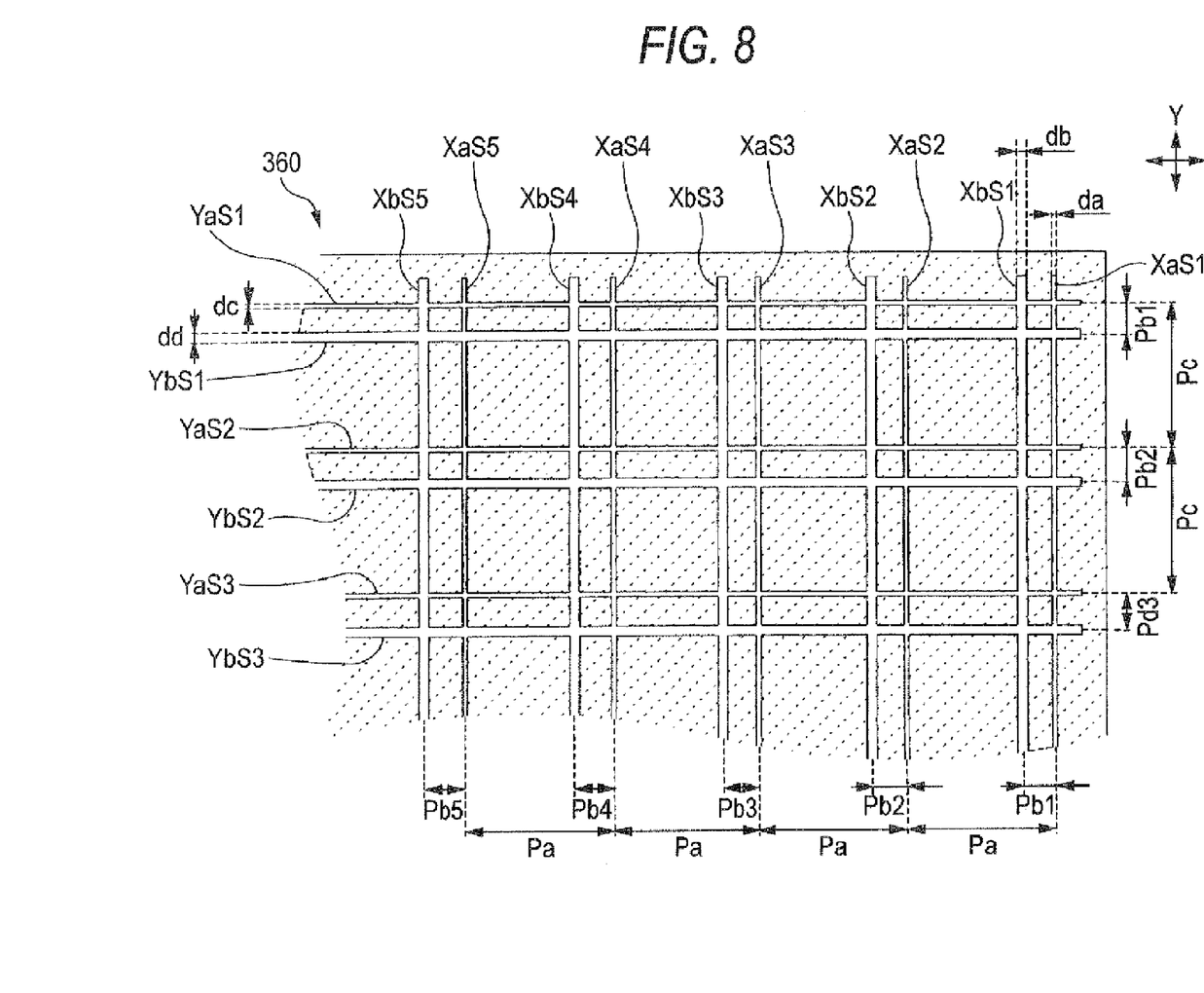
FIG. 8 is a view showing slits formed in a slit plate.

FIG. 8 is a view showing slits formed in the slit plate 360. A horizontal direction is taken as the X-axis direction corresponding to the moving direction of the movable support base 310, and a vertical direction orthogonal to the horizontal direction is taken as the Y-axis direction. A plurality of slits XaSn (n=1, 2, . . . ) extending in the Y-axis direction are formed in parallel and at given intervals of Pa in the slit plate 360. All of the slits XaSn have a width da. The interval Pa is narrower than a light-receiving width DX (see FIG. 9) of the sensor 370 in the X-axis direction.

In order to specify the slit XaSn (a block where the slits XaSn are arranged), a plurality of index slits XbSn (n=1, 2, . . . ) extending in the Y-axis direction are formed in parallel between the slits XaSn. All of the index slits XbSn have a width db which differs from the width da. The layout and positions of the index slits XbSn are set such that an interval Pbn (n=1, 2, . . . ) between the index slit XbSn and the corresponding slit XaSn becomes gradually wider or narrower. As a result of the width da of the slit XaSn differing from the width db of the index slit XbSn, the slits XaSn and the index slits XbSn can be detected in a distinguished manner. Moreover, which one of the slits XaSn has been detected can be identified by the interval Pbn. In the present embodiment, the layout and positions of the index slits XbS1, XbS2, . . . are set such that the intervals Pb1, Pb2, . . . between the index slits XaS1, XbS2, . . . and the corresponding slits XaS1, XaS2, . . . become gradually wider.

A plurality of slits YaSn (n=1, 2, . . . ) extending in the X-axis direction are formed in the slit 360 in parallel and at given intervals Pc (may also be equivalent to the interval Pa). All of the slits YaSn have a width dc (which may be equivalent to the width da). The intervals Pc are narrower than a light-receiving width DY (see FIG. 9) of the sensor 370 in the Y-axis direction.

In order to specify the slits YaSn (a block where the slits YaSn are arranged), a plurality of index slits YbSn (n=1, 2, . . . ) extending in the X-axis direction are formed in parallel and between the slits YaSn. All of the index slits YbSn have a width dd (which may be equivalent to the width db). The layout and position of the index slit YbSn are set such that an interval Pdn (n=1, 2, . . . ) (which may be equivalent to the interval Pbn) between the slit YbSn and the corresponding slit YaSn becomes gradually wider or narrower. As a result of the width dc of the slit YaSn differing from the width dd of the index slit YbSn, the slit YaSn and the index slit YbSn can be detected in a distinguished manner. Moreover, which one of the slits YaSn has been detected can be identified by the interval Pdn. In the present embodiment, the layout and positions of the index slits YbS1, YbS2, . . . are set such that the intervals Pd1, Pd2, . . . between the index slits YbS1, YbS2, . . . and the corresponding slits YaS1, YaS2, . . . become gradually wider.

Respective slits of the slit plate 360 are translucent areas, and a remaining portion of the same is a light-shielding area.

<<Two-Dimensional Light-Receiving Sensor>>

Figure 9:
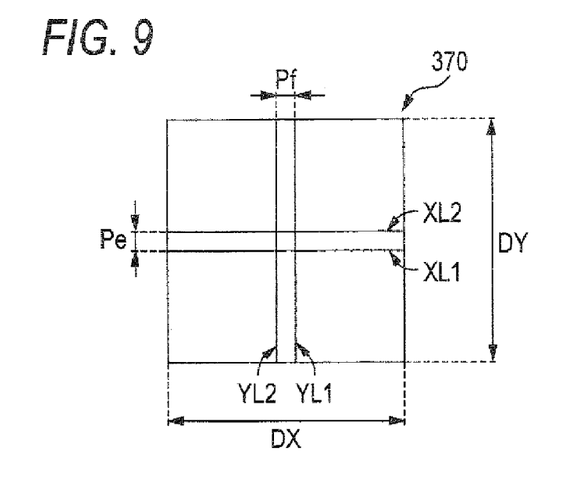
FIG. 9 is a view showing a two-dimensional light-receiving sensor.

FIG. 9 is a view showing the two-dimensional light-receiving sensor 370. As in the case of the slit plate 360, a horizontal direction is taken as the X-axis direction, and a vertical direction orthogonal to the horizontal direction is taken as the Y-axis direction. Two light-receiving lines XL1 and XL2, which extend in the X-axis direction and are parallel to each other, are selectively set in a neighborhood of the essential center of the sensor 370 in the Y-axis direction. Further, two light-receiving lines YL1 and YL2, which extend in the Y-axis direction and are parallel to each other, are selectively set in a neighborhood of the essential center of the sensor 370 in the X-axis direction. The width of one pixel is sufficient for the width of each of the light-receiving lines XL1, XL2, YL1, and YL2, but the width of a plurality of pixels may also be adopted. An interval Pe between the light-receiving line XL1 and the light-receiving line XL2 is set so as to become wider than the width da of the slit XaSn and the width db of the index slit XbSn and narrower than the interval Pbn. Likewise, an interval Pf between the light-receiving line YL1 and the light-receiving line YL2 is set so as to become wider than the width dc of the slit YaSn and the width dd of the index slit YbSn and narrower than the interval Pdn. Thus, since the light-receiving lines XL1, XL2, YL1, and YL2 are selectively set, the sensor 370 can perform high-speed detection.

Figure 10:
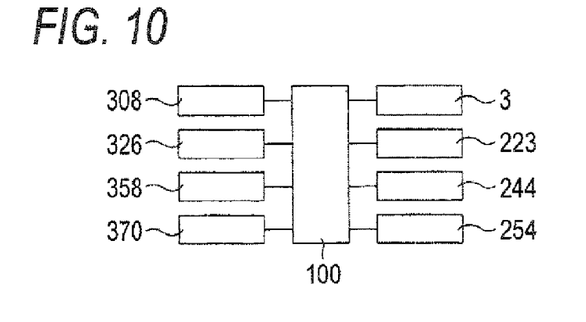
FIG. 10 is a general block diagram of a control system of the eyeglass frame measurement apparatus.

Next, measurement of the shape of the rim of the frame F will be described. FIG. 10 is a general block diagram of a control system of the apparatus 1. After the frame F has been held in the holding unit 200, measurement is commenced by depression of a measurement start switch of the display 3. An arithmetic operation control portion 100 activates the motors 308 and 326, and the leading end of the tracing stylus 340 is inserted into the inner groove of the rim of the held frame F. Next, the motor 254 is driven, to thus rotate the rotational base 250. At this time, driving torque is imparted to the motor 308 such that there is imparted pressure of an order of magnitude which does not cause removal of the tracing stylus 340 from the inner groove of the rim, without involvement of deformation of the rim. Moreover, drive torque is imparted to the motor 326 such that load exerted on the movement support base 320 or the like is cancelled. When the rotational base 250 is rotated while the leading end of the tracing stylus 340 remains inserted in the inner groove of the rim, the shaft 330 and the movable support base 320 are moved in the X-axis direction along with the movable support base 310 in accordance with a positional change along the inner groove of the rim in the radius direction (i.e., the radius length) "r." Moreover, the shaft 330 and the movable support base 320 are moved in the Y-axis direction in accordance with a positional change along the inner groove of the rim in the warpage direction (i.e., the warpage height). In response to movement of the movable support base 320, the slit plate 360 is also moved between the light-emitting portion 358 and the sensor 370. The radius vector length "r" corresponding to the amount of movement of the movable support base 320 (i.e., the shaft 330) in the X-axis direction and the warpage height "h" corresponding to the amount of movement of the movable support base 320 in the Y-axis direction are detected at every minute rotational angle θ of the rotational base 250, whereby the three-dimensional shape of the rim of the frame F is obtained.

A method for determining the radius length "r" and the warpage height "h" by the slit plate 360 and the sensor 370 is described by reference to FIG. 11. Detection of the slit XaSn for obtaining the radius length "r" will first be described. While a left end OX of the sensor 370 is taken as a reference position, the radius length "r" is determined from a distance Xa to a position of the slit XaSn detected at the rightmost area along the receiving-light line XL1 or XL2. The index slit XbSn and the corresponding slit XaSn can be distinguished from each other by a difference between the width da of the slit XaSn and the width db of the index slit XbSn. One of the intervals Pbn is determined to correspond to an interval DXb between the slit XaSn detected along the light-receiving line XL1 or XL2 and the corresponding index slit XbSn, whereby the detected slit XaSn and the corresponding index slit XbSn can be identified. In the present embodiment, the position of the slit XaSn, or the like, is set to the center position of the width da, or the like.

The radius length "r" is determined by the following equation. In the equation, "n" designates a number (block number) assigned to the slit XaSn.

Radius length "r"=Xa+Pa×(n−1)

For instance, when the interval DXb between the slit XaSn detected at the rightmost area along the light-receiving line XL1 or XL2 and the corresponding adjacent index slit XbSn corresponds to the interval Pb1, the detected slit is identified as the slit XaS1. Since n=1 is obtained, the radius length "r"=Xa is achieved.

Figure 11:
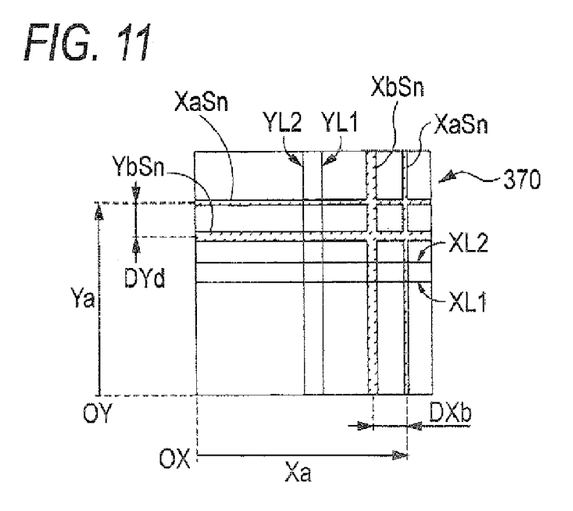
FIG. 11 is a view for describing a method for determining length of a radius of a rim of an eyeglass frame and height of warpage of the same by the slit plate and the two-dimensional light-receiving sensor.

When the slit plate 360 is moved rightward in FIG. 11, the slit XaS1 is not detected. However, the interval Pa between the slit XaS1 and an adjacent slit is narrower than the light-receiving width DX of the sensor 370, and hence the next slit XaS2 is detected. When the slit XaS2 is identified, n=2 is obtained, and hence the radius length "r"=Xa+Pa is achieved.

In subsequent operation, as a result of the slit XaSn being identified, the arithmetic operation control portion 100 determines the radius length "r".

It may be the case that not all of the intervals Pa are constant. For instance, an interval between previously-detected adjacent slits XaSn may also be utilized. Specifically, an interval is previously set such that an interval between the slit XaS1 and the slit XaS2 is taken as Pa1, such that an interval between the slit XaS2 and the slit XaS3 is taken as Pa2, . . . , and the like. For instance, when the slit XaS4 is detected, the radius length "r"=Xa+Pa1+Pa2+Pa3 is achieved.

Detection of the slit YaSn for obtaining the warpage height "h" will now be described. While a lower end OY of the sensor 370 is taken as a reference position, the warpage height "h" is determined from a distance Ya to a position of the slit YaSn detected at the uppermost area along the light-receiving line YL1 or YL2. The index slit YbSn and the corresponding slit YaSn can be distinguished from each other by a difference between the width dc of the slit YaSn and the width dd of the index slit YbSn. One of the intervals Pdn is determined to correspond to an interval DYd between the slit YaSn detected along the light-receiving line YL1 or YL2 and the corresponding index slit YbSN, whereby the detected slit YaSn and the corresponding index slit YbSn can be identified. In the present embodiment, the position of the slit YaSn, or the like, is set to the center position of the width dc, or the like.

The warpage height "h" is determined by the following equation. In the equation, "n" designates a number (block number) assigned to the slit YaSn.

Warpage height "h"=Ya+Pc×(n−1)

For instance, when the interval DYd between the slit YaSn detected at the uppermost area along the light-receiving line YL1 or YL2 and the corresponding adjacent index slit YbSn corresponds to the interval Pd1, the detected slit is identified as the slit YaS1. Since n=1 is obtained, the warpage height "h"=Ya is achieved.

When the slit plate 360 is moved upward in FIG. 11, the slit YaS1 is not detected. However, the interval Pc between the slit YaS1 and an adjacent slit is narrower than the light-receiving width DY of the sensor 370, and hence the next slit YaS2 is detected. When the slit YaS2 is identified, n=2 is obtained, and hence the warpage height "h"=Ya+Pc is achieved.

In subsequent operation, as a result of the slit YaSn being identified, the arithmetic operation control portion 100 determines the warpage height "h".

It may be the case that not all of the intervals Pc are constant. For instance, an interval between previously-detected adjacent slits YaSn may also be utilized. Specifically, an interval is previously set such that an interval between the slit YaS1 and the slit YaS2 is taken as Pd1, such that an interval between the slit YaS2 and the slit YaS3 is taken as Pc2, . . . , and the like. For instance, when the slit YaS4 is detected, the warpage height "h"=Ya+Pc1+Pc2+Pc3 is achieved.

As mentioned above, the arithmetic operation control portion 100 obtains the three-dimensional shape (rn, θn, hn) (n=1, 2, . . . , N) of the rim by rotating the rotational base 250 at every minute rotational angle θn (n=1, 2, . . . , N) and obtaining the radius length "r" and the warpage height "h" at every rotational angle θn.

Figure 12:
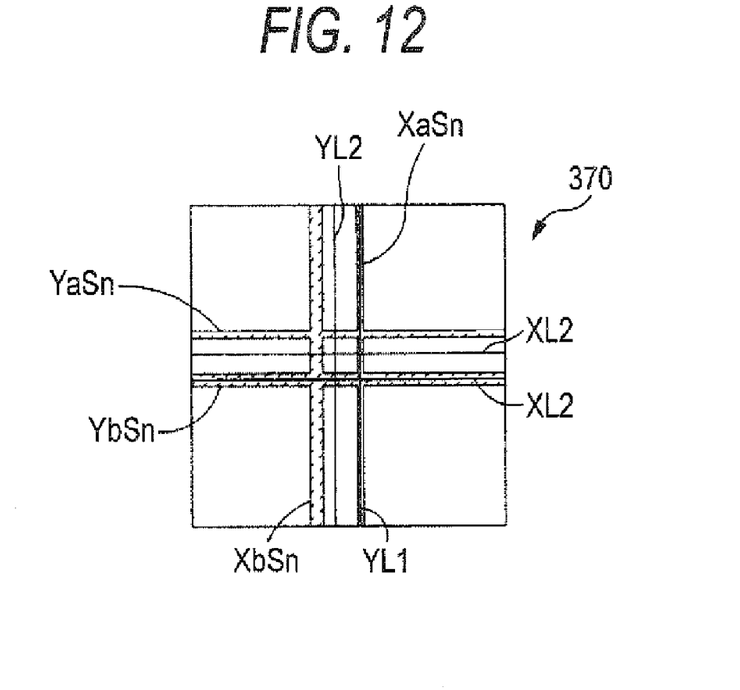
FIG. 12 is a view for explaining reasons for setting, in the sensor, a plurality of laterally-extending light-receiving lines and a plurality of longitudinally-extending light-receiving lines.

Next, the reason why the two light-receiving lines XL1 and XL2 extending in the X-axis direction and the two light-receiving lines YL1 and YL2 extending in the Y-axis direction are set in the sensor 370 will be described. As mentioned above, the radius length "r" is obtained from either one of the light-receiving lines XL1 and XL2, and the warpage height "h" is obtained from either one of the light-receiving lines YL1 and YL2. However, the slits XaSn and XbSn and the light-receiving lines XL1 or XL2 are in the positional relationship as mentioned above. The slits YaSn and YbSn and the light-receiving lines YL1 or YL2 are in the positional relationship as mentioned above. For instance, as shown in FIG. 12, when the slit XaSn perfectly coincides with the light-receiving line YL1 as a result of movement of the slit plate 360, the light-receiving line YL1 becomes unable to detect the slit YaSn and the index slit YbSn.

In this case, the light-receiving line YL2 set separately from the light-receiving line YL1 is used for detecting the slit YaSn and the index slit YbSn. Therefore, the light-receiving lines YL1 and YL2 have a positional relationship which does not coincide with the positional relationship between the slit XaSn and the index slit XbSn, and are set so as not to lie buried in these slits.

Likewise, the light-receiving lines XL1 and XL2 have a positional relationship which does not coincide with the positional relationship between the slit YaSn and the index slit YbSn, and are set so as not to lie buried in these slits.

In the above-mentioned embodiment, the apparatus is configured such that collimated light is projected from the light-emitting portion 358, the slits of the slit plate 360 are projected, as they are, on the sensor 370, and measurement becomes simple. In this case, light originating from the light source is converted into the collimated light by, e.g., a collimator lens. When a point light source is used as the light-emitting portion 358 in order to simplify the configuration of the apparatus, a location on the sensor 370 where the slits are to be projected is corrected as follows.

Figure 13:
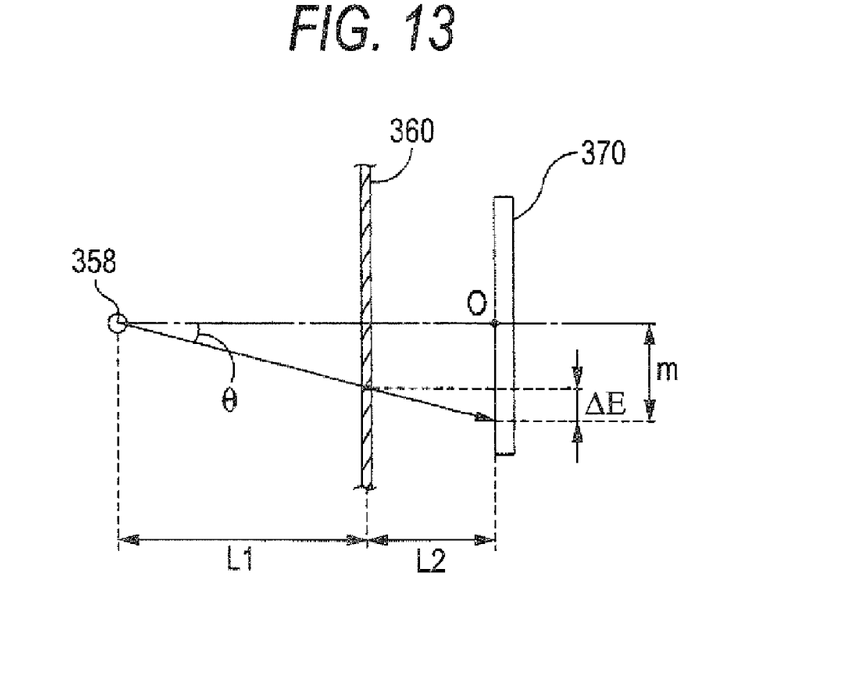
FIG. 13 is a view for describing correction of a position where the slits are projected when a light-emitting portion is embodied as a point-source light.

A correction of a projection position of the slits made when the point light source is taken as the light-emitting portion 358 will be described by reference to FIG. 13. Provided that a distance from the point light source 358 to the slit plate 360 is taken as L1; that a distance from the slit plate 360 to a light-receiving plane of the sensor 370 is taken as L2; and that an error in the projection position of the slits, which is separated from the center O of the sensor 370 corresponding to the center of the point light source 358 by a distance "m," is taken as ΔE; ΔE=m×(L2/L1+1) is obtained. Consequently, at the time of computation of the projection position of the slits, the projection position is preferably corrected by an amount corresponding to the error ΔE.

The above embodiment can be modified in various manners. For instance, in the above descriptions, the index slit XbSn is formed in the vicinity of the slit XaSn in order to specify the slit XaSn. However, the present embodiment is not limited to this. For instance, the slit XaSn may also be specified by a difference between the widths da of the slits XaSn. The same also applies to the slit YaSn.

The slit XaSn used for detecting the movement of the movable supportbase 320 (the shaft 330) in the X-axis direction is not parallel to the light-receiving line XL1 or XL2, and the slit YaSn used for detecting the movement of the movable support base 320 (the shaft 330) in the Y-axis direction is not parallel to the light-receiving line YL1 or YL2, as well. When the slit is oblique with reference to the light-receiving line, resolution for detecting the projection position of the slits is deteriorated. Therefore, the slit XaSn preferably crosses the light-receiving line XL1 or XL2 at right angles, and the slit YaSn preferably crosses the light-receiving line YL1 or YL2 at right angles. The minimum requirement is that the light-receiving line XL1 or X XL2 is not parallel to the light-receiving line YL1 or YL2, but preferably they intersect at right angles.

In the above descriptions, the light-projection-and-receiving unit 350 is fixed to the rotational base 250, and the slit plate 360 is moved along with the shaft 330 (the tracing stylus 340) while being fixed to the movable support base 320. However, the slit plate 360 may be fixed to the rotational base 250, and the light-projection-and-receiving unit 350 may be moved along with the shaft 330 (the tracing stylus 340) while being fixed to the movable support base 320.

What is claimed is:

1. An eyeglass frame measurement apparatus for measuring a shape of a rim of an eyeglass frame, comprising:
   a holding unit that holds the frame in a predetermined state;
   a rotational base arranged to be rotatable with respect to the holding unit;
   a tracing stylus to be inserted into an inner groove of the rim, the tracing stylus being arranged on the rotational base to be movable in a radius direction and a warpage direction of the rim;
   a light-projection-and-receiving unit that includes a light-emitting portion and a two-dimensional light-receiving sensor capable of selecting a pixel which receives light from the light-emitting portion;
   a slit plate interposed between the light-emitting portion and the sensor; and
   an arithmetic operation portion that obtains a three-dimensional shape of the rim by detecting, based on a result of receipt of the light by the sensor, movements of the tracing stylus inserted in the inner groove of the rim along the radius vector direction and the warpage direction in response to rotation of the rotational base,
   wherein one of the light-projection-and-receiving unit and the slit plate is fixedly arranged on the rotational base, and the other is arranged to be movable along with the tracing stylus,
   wherein the sensor includes a first light-receiving line and a second light-receiving line which are not parallel to each other and for which the pixel for receiving the light from the light-emitting portion is selectively set,
   wherein the slit plate includes a first slit which permits passage of the light to be received by the first light-receiving line and is not parallel to the first light-receiving line, and a second slit which permits passage of the light to be received by the second light-receiving line and is not parallel to the second light-receiving line, and
   wherein the arithmetic operation portion detects the movements of the tracing stylus in the radius direction and the warpage direction based on a result of receipt of the light by the first and second light-receiving lines.

2. The eyeglass frame measurement apparatus according to claim 1, wherein
   the first light-receiving line crosses the second light-receiving line at right angles;
   the first slit crosses the first light-receiving line at right angles; and
   the second slit crosses the second light-receiving line at right angles.

3. The eyeglass frame measurement apparatus according to claim 1, wherein the sensor includes a plurality of the first parallel light-receiving lines and a plurality of the second parallel light-receiving lines.

4. The eyeglass frame measurement apparatus according to claim 1, wherein
   at least one of the first and second slits is formed plurally in the slit plate at intervals narrower than a light-receiving width of the sensor, and widths of the slits are equal to each other; and
   the slit plate includes an index for specifying each of the slits.

5. The eyeglass frame measurement apparatus according to claim 1, wherein at least one of the first and second slits is formed plurally in the slit plate at intervals narrower than the light-receiving width of the sensor, and widths of the slits differ from each other.

* * * * *